US012570870B2

(12) United States Patent
Zhang et al.

(10) Patent No.: US 12,570,870 B2
(45) Date of Patent: Mar. 10, 2026

(54) CURABLE COMPOSITIONS, ABRASION-RESISTANT ARTICLES, AND METHOD OF THERMOFORMING THE SAME

(71) Applicant: 3M INNOVATIVE PROPERTIES COMPANY, St. Paul, MN (US)

(72) Inventors: Chunjie Zhang, Shoreview, MN (US); Jung-Sheng Wu, Woodbury, MN (US); Thomas P. Klun, Lakeland, MN (US); Richard J. Pokorny, Maplewood, MN (US); Benjamin R. Coonce, South St. Paul, MN (US); Gregg A. Ambur, River Falls, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 629 days.

(21) Appl. No.: 17/436,925

(22) PCT Filed: Apr. 8, 2020

(86) PCT No.: PCT/IB2020/053358

§ 371 (c)(1),
(2) Date: Sep. 7, 2021

(87) PCT Pub. No.: WO2020/208547

PCT Pub. Date: Oct. 15, 2020

(65) Prior Publication Data

US 2022/0169888 A1 Jun. 2, 2022

Related U.S. Application Data

(60) Provisional application No. 62/832,511, filed on Apr. 11, 2019.

(51) Int. Cl.

| | |
|---|---|
| ***C09D 175/14*** | (2006.01) |
| ***B05D 5/00*** | (2006.01) |
| ***B05D 7/00*** | (2006.01) |
| ***C08G 18/24*** | (2006.01) |
| ***C08G 18/67*** | (2006.01) |
| ***C08G 18/73*** | (2006.01) |
| ***C08K 3/22*** | (2006.01) |
| ***C09D 7/40*** | (2018.01) |
| ***C09D 7/61*** | (2018.01) |
| ***G02B 1/04*** | (2006.01) |
| ***G02B 1/14*** | (2015.01) |
| *B29C 51/14* | (2006.01) |
| *B29K 75/00* | (2006.01) |
| *B29K 509/02* | (2006.01) |

(52) U.S. Cl.

CPC ............ *C09D 175/14* (2013.01); *B05D 5/00* (2013.01); *B05D 7/56* (2013.01); *B05D 7/58* (2013.01); *C08G 18/246* (2013.01); *C08G 18/6755* (2013.01); *C08G 18/73* (2013.01); *C08K 3/22* (2013.01); *C09D 7/61* (2018.01); *C09D 7/67* (2018.01); *G02B 1/04* (2013.01); *G02B 1/14* (2015.01); *B29C 51/14* (2013.01); *B29K 2075/00* (2013.01); *B29K 2509/02* (2013.01); *C08K 2003/2227* (2013.01); *C08K 2201/005* (2013.01); *C08K 2201/011* (2013.01)

(58) Field of Classification Search

None

See application file for complete search history.

(56) References Cited

U.S. PATENT DOCUMENTS

| | | | |
|---|---|---|---|
| 2,830,038 | A | 4/1958 | Pattison |
| 3,624,178 | A | 11/1971 | Fatzer |
| 4,131,602 | A | 12/1978 | Hodakowski |
| 4,713,138 | A | 12/1987 | Ungar |
| 5,480,958 | A | 1/1996 | Starner |
| 5,484,853 | A | 1/1996 | Chen |
| 6,699,586 | B2 | 3/2004 | Edelmann |
| 6,750,309 | B1 | 6/2004 | Chu |
| 8,343,622 | B2 | 1/2013 | Liu |
| 8,383,694 | B2 | 2/2013 | Klun |
| 8,431,054 | B2 | 4/2013 | Pervan |
| 8,476,398 | B2 | 7/2013 | Klun |

(Continued)

FOREIGN PATENT DOCUMENTS

| | | | |
|---|---|---|---|
| CN | 105385336 | A | 3/2016 |
| JP | 60-141280 | A | 7/1985 |

(Continued)

OTHER PUBLICATIONS

AEROXIDE® Alu C, Evonik Industries, 2017, [On-line], [retrieved from the internet on Aug. 18, 2017], URL. <http://www.aerosil.com/lpa-productfinder/page/productsbytext/detail.html?pid=1857>, 2 pages.

Contronics 700 Series Castable Ceramics, Material Safety Data Sheet, 2009, 2 pages.

Database WPI Week 201640 Thomson Scientific, London, Mar. 2016, 2 pages, XP002799725.

Johansson, "Influence of Resin Composition on the Defect Formation in Alumina Manufactured by Stereolithography", Materials 2017, vol. 10, No. 2, pp. 1-11.

Kardar, "Study the effect of nano-alumina particles on physical-mechanical properties of UV cured epoxy acrylate via nano-indentation", Progress in Organic Coatings, 2008, vol. 62, pp. 321-325, XP22586217.

Mohanty, "Effect of Alumina Nanoparticles on the Enhancement of Impact and Flexural Properties of the Short Glass/Carbon Fiber Reinforced Epoxy Based Composites", Fibers and Polymers, 2015, vol. 16, No. 1, pp. 188-195.

(Continued)

*Primary Examiner* — Sheeba Ahmed

(74) *Attorney, Agent, or Firm* — Julie Lapos-Kuchar; Bradford B. Wright

(57) ABSTRACT

A curable composition comprises at least one polymerizable compound and alpha-alumina particles. The alpha-alumina particles, taken as a whole, have a $D_v50$ of less than 100 nanometers. The corresponding cured composition, and an abrasion-resistant article comprising an abrasion-resistant layer comprising the reaction product disposed on a substrate are also disclosed. A method that includes thermoforming the abrasion-resistant article is also disclosed.

15 Claims, 1 Drawing Sheet

(56) References Cited

U.S. PATENT DOCUMENTS

| | | | | |
|---|---|---|---|---|
| 8,628,855 | B2 | 1/2014 | Hao | |
| 8,728,623 | B2 | 5/2014 | Pokorny | |
| 8,889,801 | B2 | 11/2014 | Liao | |
| 9,201,171 | B2 | 12/2015 | Inomata | |
| 9,790,396 | B2 | 10/2017 | Klun | |
| 2012/0177928 | A1* | 7/2012 | You | C08L 33/06 977/773 |
| 2012/0259065 | A1 | 10/2012 | Sommer | |
| 2012/0301676 | A1 | 11/2012 | Ushida | |
| 2014/0193624 | A1* | 7/2014 | Stiens | C23C 28/044 428/216 |
| 2015/0159036 | A1 | 6/2015 | Murugesan | |
| 2016/0137879 | A1 | 5/2016 | Miki | |
| 2016/0326383 | A1 | 11/2016 | Pokorny | |

FOREIGN PATENT DOCUMENTS

| | | | |
|---|---|---|---|
| JP | 5-331299 | A | 12/1993 |
| JP | 2009-221358 | A | 10/2009 |
| JP | 4459880 | B2 | 4/2010 |
| JP | 2011-025691 | A | 2/2011 |
| JP | 5385863 | B2 | 1/2014 |
| WO | WO 98-130625 | | 7/1998 |
| WO | WO 2009-005975 | | 1/2009 |
| WO | WO 2013-065159 | | 5/2013 |
| WO | WO 2014-011731 | | 1/2014 |
| WO | WO 2019-116181 | | 6/2019 |
| WO | WO 2019-116188 | | 6/2019 |
| WO | WO 2019-234560 | | 12/2019 |
| WO | WO 2019-239271 | | 12/2019 |
| WO | WO 2020-208545 | | 10/2020 |

OTHER PUBLICATIONS

Nano Aluminum Oxide, Al2O3, Nanophase Nanoengineered Products, 2019, [On-line], [retrieved from the internet on Mar. 25, 2019], URL. <http://nanophase.com/products/aluminum-oxide/>, 3 pages.

Rescor Castable Ceramics Use to 4000F, Cotronics Corp., [retrieved from the internet on Feb. 26, 2019] <http://www.sflee.co.kr/composites/CotronicsE/cat55/onepg700.pdf>,1 page.

Sadabadi, "High purity Alpha Alumina nanoparticle: Synthesis and characterization", International Journal of Scientific & Engineering Research, Apr. 2013, vol. 4, No. 4, pp. 1593-1596.

Sakar, "Preparation and Characterization of Alumina Powders and Suspensions", Izmir Institute of Technology, Sep. 2000, pp. 1-136.

Wetzel, "Epoxy nanocomposites—fracture and toughening mechanisms", Engineering Fracture Mechanics, 2006, vol. 73, pp. 2375-2398.

Zhang, "The Effects of Alumina Nanofillers on Mechanical Properties of High-Performance Epoxy Resin", Journal of Nanoscience and Nanotechnology, 2010, vol. 10, pp. 1-7.

International Search Report for PCT International Application No. PCT/IB2020/053358, mailed on Jul. 30, 2020, 5 pages.

* cited by examiner

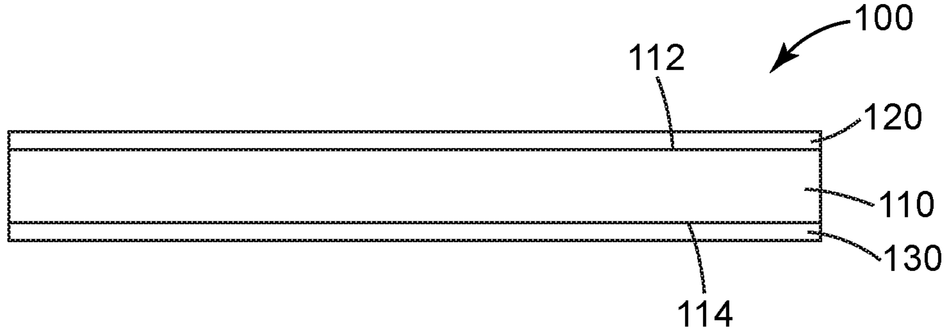
100
112
120
110
130
114

CURABLE COMPOSITIONS, ABRASION-RESISTANT ARTICLES, AND METHOD OF THERMOFORMING THE SAME

TECHNICAL FIELD

The present disclosure broadly relates to curable compositions containing alumina particles and at least one polymerizable compound, the corresponding cured compositions, and abrasive-resistant articles including them.

BACKGROUND

Organic polymer films are widely used to provide abrasion resistance to various substrates such as, for example, electronic display glass, eyewear, automotive body panels, and architectural surfaces. Inclusion of reinforcing particles is one technique commonly used to enhance mechanical properties (e.g., abrasion resistance) of polymeric systems resulting in a polymer composite (i.e., polymer and reinforcing particles) film. To further enhance mechanical properties, one or more coupling agents are chemically bound to the reinforcing particles and the polymeric matrix of the polymer composite film. While beneficial, this extra step increases cost and complexity to the manufacturing process.

In some cases, the polymer composite films are thermoformed at some point during their manufacture or during application to a substrate; for example, during a thermoforming and injection molding backfill process. However, the changes in mechanical properties due to inclusion of reinforcing particles in polymer composite films can make them difficult to successfully thermoform.

SUMMARY

The present disclosure provides curable compositions and abrasion resistant articles that overcome these difficulties by providing abrasion resistant articles that can be thermoformable, and do not need added reactive coupling agent to be effective for many applications.

While reactive coupling agents are commonly added to curable compositions containing alpha-alumina oxide particles of sizes larger than 100 nm to improve various mechanical properties, the present inventors have discovered that the relative benefit of these coupling agents becomes practically insignificant for alpha-alumina oxide particles of sizes smaller than 100 nm.

In one aspect, the present disclosure provides a curable composition comprising:

at least one polymerizable compound; and alpha-alumina particles, wherein the alpha-alumina particles, taken as a whole, have a $D_V50$ of less than 100 nanometers.

In another aspect, the present disclosure provides a polymerizable reaction product of components comprising:

at least one polymerizable compound; and alpha-alumina particles, wherein the alpha-alumina particles, taken as a whole, have a $D_V50$ of less than 100 nanometers.

In another aspect, the present disclosure provides an abrasion-resistant article comprising a substrate having an abrasion-resistant layer disposed thereon, wherein the abrasion-resistant layer comprises an at least partially cured reaction product of a curable composition according to the present disclosure.

In yet another aspect, the present disclosure provides a method of making an abrasion-resistant thermoformed article, the method comprising thermoforming an abrasion-resistant article according to the present disclosure.

As used herein:

the term "alpha-alumina particle" refers to abrasive particles wherein at least 90 weight percent (preferably at least 95 weight percent, or even at least 99 weight percent) of the alumina in the particle has the alpha crystalline form.

The term "carbamylene" refers to the divalent group

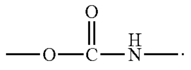

The term "polyurethane precursor system" refers collectively to components that can react to form a polyurethane. Examples include combinations of polyisocyanates (or blocked polyisocyanates) and polyols, optionally also including a catalyst (e.g., supplied as a one-part of two-part system).

The term "Dv50" refers to that particle diameter at which 50 percent by volume of the particles in a distribution of particles have that diameter or a smaller diameter.

The term "Dv90" refers to that particle diameter at which 90 percent by volume of the particles in a distribution of particles have that diameter or a smaller diameter.

In the case of alpha-alumina particles referred to in the present disclosure, particle size may be determined by laser diffraction (e.g., using a Horiba LA-960 particle size analyzer according to ISO 13320:2009 "Particle size analysis—Laser diffraction methods", International Organization for Standardization, Geneva, Switzerland.)

The prefix "(meth)acryl" means "acryl" and/or "methacryl".

The term "particle diameter" refers to the diameter of spherical particles, and the average particle diameter for non-spherical particles.

The term "particle size" refers to particle diameter.

Features and advantages of the present disclosure will be further understood upon consideration of the detailed description as well as the appended claims.

BRIEF DESCRIPTION OF THE DRAWINGS

FIG. 1 is a schematic side view of an abrasion resistant article 100 according to the present disclosure.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The FIGURES may not be drawn to scale.

DETAILED DESCRIPTION

Curable compositions according to the present disclosure include at least one polymerizable compound and alpha-alumina particles. The alpha-alumina particles, taken as a whole (i.e., the total of all alpha-alumina particles in the curable composition), have a $D_V50$ of less than 100 nanometers.

Useful polymerizable compounds may include epoxy compounds, free-radically polymerizable compounds (e.g., vinyl benzenes, vinyl ethers, vinyl esters, N-vinylamides, and (meth)acrylates), 1- and/or 2-part polyurethanes, polyisocyanates, cyanates, phenolics, aminoplasts, and combinations thereof. In some preferred embodiments, the polymerizable compound(s) comprise free-radically polymerizable compounds.

In some embodiments polymerizable compounds may include a polymerizable monomer, oligomer, and/or polymer having at least one carbamylene group. Preferably, at least some of the polymerizable compound(s) have at least one (preferably at least two) polymerizable groups (e.g., (meth)acryl groups, epoxy groups, isocyanato groups).

Useful (meth)acrylate monomers may have an average (meth)acrylate functionality of 1 to 2, or more. These monomers may function as diluents or solvents, as viscosity reducers, as binders when cured, and as crosslinking agents, for example.

Examples of useful (meth)acrylates having an average (meth)acrylate functionality of 1 to 2 include mono(meth) acrylates such as octyl (meth)acrylate, nonylphenol ethoxylate (meth)acrylate, isononyl (meth)acrylate, isobornyl (meth)acrylate, 2-(2-ethoxyethoxy)ethyl (meth)acrylate, 2-ethylhexyl (meth)acrylate, lauryl (meth)acrylate, beta-carboxyethyl (meth)acrylate, isobutyl (meth)acrylate, 2-hydroxyethyl (meth)acrylate, isodecyl (meth)acrylate, dodecyl (meth)acrylate, n-butyl (meth)acrylate, methyl (meth) acrylate, hexyl (meth)acrylate, (meth)acrylic acid, stearyl (meth)acrylate, hydroxy functional caprolactone ester (meth)acrylate, isooctyl (meth)acrylate, hydroxymethyl (meth)acrylate, hydroxypropyl (meth)acrylate, hydroxyisopropyl (meth)acrylate, hydroxybutyl(meth)acrylate, hydroxyisobutyl (meth)acrylate, tetrahydrofurfuryl (meth) acrylate, and alkoxylated versions of the above (meth) acrylate monomers, such as alkoxylated tetrahydrofurfuryl (meth)acrylate and combinations thereof. Tetrahydrofurfuryl (meth)acrylate is preferred in some embodiments; di(meth)acrylates such as 1,6-hexanediol di(meth)acrylate, poly (ethylene glycol) di(meth)acrylates, polybutadiene di(meth) acrylates, polyurethane di(meth)acrylates, ethylene glycol di(meth)acrylate, hexanediol di(meth)acrylate, diethylene glycol di(meth)acrylate, triethylene glycol di(meth)acrylate, tetraethylene glycol di(meth)acrylate, neopentyl glycol di(meth)acrylate, alkoxylated versions of the above di(meth) acrylates, and combinations thereof. Of these, 1,6-hexanediol diacrylate is preferred in some embodiments. (Meth) acrylate monomers having a functionality of 1 or 2 (e.g., as listed above) are widely commercially available.

Exemplary useful silicone (meth)acrylates include mono- and polyfunctional silicone (meth)acrylates. Of these, silicone poly(meth)acrylates may be preferred because the likelihood of unbound silicone (meth)acrylate after curing is generally reduced. Exemplary silicone (meth)acrylates include EBECRYL 350 silicone diacrylate and EBECRYL 1360 silicone hexaacrylate from Allnex, CN9800 aliphatic silicone acrylate and CN990 siliconized urethane acrylate compound from Sartomer Co., and TEGO RAD 2100, TEGO RAD 2250, and TEGO RAD 2500 silicone polyether acrylate from Evonik Industries, Parsippany, N.J.

Examples of commercially available urethane (meth) acrylate oligomers include those available from Sartomer Co., Exton, Pa. as N3D-1330, N3D-1150, M-CURE 203, CN9302, CN9004, CN9005, CN9006, CN9007, CN9023, CN9028, CN9178, CN9290US, CN986, CN989, CN9893, CN996, CN2920, CN3211, CN9001, CN9009, CN9010, CN959, CN9011, CN9062, CN9071, CN9014, CN9070, CN929, CN945A70, CN9025, CN9026, CN962, CN964, CN965, CN968, CN969, CN980, CN981, CN983, CN991, CN2921, CN981B88, CN985B88, CN963B80, CN982B88, CN961H81, CN966H90, CN963A80, CN964A85, CN982A75, CN963E80, CN963J85, CN966J7, CN9013, CN9018, CN9024, CN9030, CN9031, CN9032, CN9039, CN9102, CN9167US, CN9782, CN9783, CN992, CN902J75, CN975, CN972, CN973H85, N970A60, CN971A80, CN973A80, CN970E60, CN973J75, CN971J75, CN9072, CN9014, CN9070, CN966H90, CN966J75, CN9018, CN990, CN1964, CN1963, CN9788, and SARBIO 7402; and those available from Allnex, Frankfurt, Germany, as EBECRYL 220, EBECRYL 221, EBECRYL 230, EBECRYL 246, EBECRYL 271, EBECRYL 1290, EBECRYL 1291, EBECRYL 4100, EBECRYL 4101, EBECRYL 4200, EBECRYL 4201, EBECRYL 4265, EBECRYL 4500, EBECRYL 4587, EBECRYL 4654, EBECRYL 4666, EBECRYL 4738, EBECRYL 4740, EBECRYL 4858, EBECRYL 4859, EBECRYL 5129, EBECRYL 8210, EBECRYL 8296, EBECRYL 8301-R, EBECRYL 8402, EBECRYL 8415, EBECRYL 8465, EBECRYL 8602, EBECRYL 8604, EBECRYL 8702, EBECRYL 8804, EBECRYL 8807, EBECRYL 8810, and EBECRYL 8811.

(Meth)acrylated polyurethanes may be prepared by known methods such as, for example, those described in U.S. Pat. No. 6,750,309 (Chu et al.) and U.S. Pat. No. 4,131,602 (Hodakowski), or obtained from commercial suppliers. These may be obtained as aqueous dispersions, for example, as described in U. S. Pat. Appl. Publ. No. 2012/0259065 A1 (Sommer et al.). Aliphatic polyurethane acrylate aqueous dispersions are available from Allnex as UCECOAT 2501, UCECOAT 7571, UCECOAT 7655, UCECOAT 7674, UCECOAT 7689, UCECOAT 7700, UCECOAT 7717, UCECOAT 7734, UCECOAT 7770, UCECOAT 7773, UCECOAT 7788, UCECOAT 7849, UCECOAT 7856, and UCECOAT 7892.

Combinations of urethane (meth)acrylate oligomers and/or (meth)acrylated polyurethanes may also be used.

Polyisocyanates can readily be obtained from a wide array of commercial sources or made by known methods. Examples of commercially available polyisocyanates include those available from Covestro, Pittsburgh, Pa. as DESMODUR E-15, DESMODUR H, DESMODUR HL BA, DESMODUR I, DESMODUR IL BA, DESMODUR IL EA, DESMODUR L 67 BA, DESMODUR L 67 MPA/X, DESMODUR L 75, DESMODUR N 100A, DESMODUR N 3200A, DESMODUR N 3300A, DESMODUR N 3368 BA/SN, DESMODUR N 3390A BA/SN, DESMODUR N 3400, DESMODUR N 3600, DESMODUR N 3790 BA, DESMODUR N 3800, DESMODUR N 3900, DESMODUR VP LS 2371, DESMODUR W, DESMODUR XP 2599, DESMODUR Z 4470 BA, DESMODUR Z 4470 MPA/X, and DESMODUR Z 4470 SN.

Blocked polyisocyanates, which generate isocyanates upon activation (e.g., heating) may also be used as polyisocyanates. Examples include those available from Chemtura, Middlebury, Conn., as TRIXENE BL 7900, TRIXENE BL 7901, TRIXENE BL 7950, TRIXENE BL 7960, TRIXENE BL 7779, TRIXENE AQUA BL 201, and TRIXENE AQUA BL 220.

Combinations of polyisocyanates and/or blocked polyisocyanates may also be used.

Polyols suitable for reaction with polyisocyanates to form polyurethanes include, for example, straight or branched chain alkane polyols, such as 1,2-ethanediol, 1,3-propanediol, 1,2-propanediol, 1,4-butanediol, 1,3-butanediol, glycerol, neopentyl glycol, trimethylolethane, trimethylolpropane, di-trimethylolpropane, erythritol, pentaerythritol and di-pentaerythritol; polyalkylene glycols, such as di-, tri- and tetraethylene glycol, and di-, tri- and tetrapropylene glycol;

cyclic alkane polyols, such as cyclopentanediol, cyclohexanediol, cyclohexanetriol, cyclohexanedimethanol, hydroxypropylcyclo-hexanol and cyclohexanediethanol; aromatic polyols, such as dihydroxybenzene, benzenetriol, hydroxybenzyl alcohol and dihydroxytoluene; bisphenols, such as 4,4'-isopropylidenediphenol (bisphenol A); 4,4'-oxybisphenol, 4,4'-dihydroxybenzophenone, 4,4'-thiobisphenol, phenolphthalein, bis(4-hydroxyphenyl)methane (bisphenol F), 4,4'-(1,2-ethenediyl)bisphenol and 4,4'-sulfonylbisphenol; halogenated bisphenols, such as 4,4'-isopropylidenebis(2,6-dibromophenol), 4,4'-isopropylidenebis(2,6-dichlorophenol) and 4,4'-isopropylidenebis(2,3,5,6-tetrachlorophenol); alkoxylated bisphenols, such as alkoxylated 4,4'-isopropylidenediphenol having one or more alkoxy groups, such as ethoxy, propoxy, alpha-butoxy and beta-butoxy groups; and biscyclohexanols, which can be prepared by hydrogenating the corresponding bisphenols, such as 4,4'-isopropylidene-biscyclohexanol, 4,4'-oxybiscyclohexanol, 4,4'-thiobiscyclohexanol and bis(4-hydroxycyclohexanol)methane; higher polyalkylene glycols, such as polyethylene glycols having a number average molecular weight ($M_n$) of from 200 to 2000 grams per mole; hydroxyl-bearing acrylics, such as those formed from the copolymerization of (meth)acrylates and hydroxy functional (meth) acrylates, such as methyl methacrylate and hydroxyethyl methacrylate copolymers; and hydroxy functional polyesters, such as those formed from the reaction of diols, such as butanediol, and diacids or diesters, such as adipic acid or diethyl adipate; and combinations thereof.

Polyols suitable for reaction with polyisocyanates to form polyurethanes include, for example, those commercially available from Covestro as DESMOPHEN 1200 BA, DESMOPHEN 1300 BA, DESMOPHEN 1300 X, DESMOPHEN 1652, DESMOPHEN 650 MPA, DESMOPHEN 651 MPA, DESMOPHEN 670 BA, DESMOPHEN 800, DESMOPHEN 850, DESMOPHEN C 1100, DESMOPHEN C 1200, DESMOPHEN C 2100, DESMOPHEN C 2200, DESMOPHEN C 3100 XP, DESMOPHEN C 3200 XP, DESMOPHEN C XP 2716, DESMOPHEN VP LS 2089, and DESMOPHEN VP LS 2388.

In the case of polyisocyanates, a catalyst may be used to facilitate reaction. Examples include dibutyltin dilaurate, 1,4-diaza[2.2.2]bicyclooctane (DABCO), 1,8-diazabicyclo [5.4.0]undec-7-ene (DBU), bis(dimethylaminoethyl) ether, N,N'-dimethylaminopiperazine, bismuth/zinc catalysts, zinc neodecanoate, bismuth octoate, and combinations thereof.

In the case of isocyanate-functional urethane prepolymers that already include a carbamylene group, a polyamine may also be used to polymerize the prepolymer. Examples include ethyleneamines such as ethylenediamine (EDA), diethylenetriamine (DETA), triethylenetetramine (TETA), tetraethylenepentamine (TEPA), pentaethylenehexamine (PEHA), piperazine, diethylenediamine (DEDA), and 2-amino-1-ethylpiperazine. Further exemplary suitable polyamines include one or more isomers of dialkyl toluenediamine, such as 3,5-dimethyl-2,4-toluenediamine, 3,5-dimethyl-2,6-toluenediamine, 3,5-diethyl-2,4-toluenediamine, 3,5-diethyl-2,6-toluenediamine, 3,5-diisopropyl-2,4-toluenediamine, 3,5-diisopropyl-2,6-toluenediamine, trimethylene glycol di(p-aminobenzoate), and amine-terminated oligomers and prepolymers, 4,4'-methylene-bis (dialkylanilines) (e.g., 4,4'-methylene-bis(2,6-dimethylaniline), 4,4'-methylene-bis(2,6-diethylaniline), 4,4'-methylene-bis(2-ethyl-6-methylaniline), 4,4'-methylene-bis(2,6-diisopropylaniline), 4,4'-methylene-bis(2-isopropyl-6-methylaniline), 4,4'-methylene-bis(2,6-diethyl-3-chloroaniline), and combinations thereof.

Combinations of polyols and/or polyamines may also be used.

In embodiments in which the at least one polyurethane precursor system includes a polyisocyanate and/or a blocked polyisocyanate, it may be formulated as a one-part system (e.g., in the case of blocked polyisocyanates) or as a two-part system (e.g., a Part A containing the polyisocyanate(s) and a Part B, physically isolated from the Part A, containing polyol and/or polyamine and optional catalyst). Other arrangements may also be used.

Examples of epoxy-terminated polyurethane oligomers and polymers include those that can be prepared, for example, by the reaction of glycidol with an isocyanato-terminated urethane prepolymer. Further details for making such compounds can be found, for example, in U.S. Pat. No. 5,480,958 (Starner et al.); U.S. Pat. No. 5,484,853 (Chen et al.); U.S. Pat. No. 3,624,178 (Fatzer et al.); and U.S. Pat. No. 2,830,038 (Pattison).

In those embodiments wherein the polymerizable compound(s) comprises at least one free-radically polymerizable compound, a free-radical initiator is preferably added (typically in an effective amount) to the curable composition to facilitate polymerization. The free-radical initiator may be a free-radical thermal initiator (i.e., thermally activated) and/or a free-radical photoinitiator (i.e., activated by absorption of electromagnetic radiation).

Suitable alpha-alumina particles, taken as a whole, have a $D_V50$ of less than 100 nanometers, preferably from 10 up to less than 100 nanometers. In some embodiments, the alpha-alumina particles, taken as a whole, have a $D_V50$ of 50 to 80 nanometers, or even 60 to 75 nanometers.

In some preferred embodiments, the curable composition and the resultant cured composition may contain less than 8, 7, 6, 5, 4, 3, or even less than 2 weight percent of alpha-alumina particles having a particle size distribution with a Dv50 of less than 100 nm, based on the total weight of alpha-alumina particles in the total curable and/or cured composition. In some embodiments, on a total weight basis, the curable composition contains 0.1 to 15 percent by weight, 0.1 to 10 percent by weight, 0.1 to 5 percent by weight, or even 0.1 to 2 percent by weight, of the alpha-alumina particles. Higher and lower amounts of the alpha-alumina particles may also be used.

The alpha-alumina particles can be made by milling larger size alpha-alumina media, for example, using a ball mill or a jet mill. If using a ball mill the milling media preferably comprises, or even consists of, alpha-alumina, although other milling media such as, for example, aluminum zirconate media may be used in combination with the alpha-alumina.

Alpha-alumina particles, which may have particle size distribution with a Dv50 of about 1 micron, can be readily obtained from commercial sources. Larger particle sizes may also be used, but milling time may be increased. Suppliers include US Research Nanomaterials, Inc., Houston, Tex.; Sisco Research Laboratories Pvt. Ltd., Mumbai, India; and Baikowski International Corp., Charlotte, N.C.

Curable compositions according to the present disclosure may optionally further comprise at least one curative for polymerizable compound, typically in an effective amount. By the term "effective amount" is meant an amount that is at least a sufficient amount to cause curing of the curable composition under polymerization conditions. Typically, the total amount of initiator (both photoinitiator and thermal initiator) is used in amounts ranging from 0.1 to 10 percent by weight (preferably 1 to 5 percent by weight), based on the total weight of the curable composition, although this is not a requirement. Exemplary, curatives for epoxides may include Lewis acids, amines, and thiols. Exemplary curatives for polyurethanes include 1,4-diazabicyclo[2.2.2]octane and dibutyltin dilaurate.

Curable compositions according to the present disclosure may be cured by any suitable means including, for example, heat (e.g., using an oven or infrared heating), mixing (in the case of a two-part polyurethane precursor system), and/or electromagnetic radiation (e.g., ultraviolet and/or visible light) in the case of a photoinitiated system. The selection of curative and associated cure conditions will be within the capability of one of ordinary skill in the art.

It will be recognized that curing may be complete even though polymerizable (meth)acrylate groups remain.

Exemplary thermal initiators include organic peroxides (e.g., diacyl peroxides, peroxy ketals, ketone peroxides, hydroperoxides, dialkyl peroxides, peroxy esters, and peroxydicarbonates), azo compounds (e.g., azobis(isobutyronitrile)).

Examples of free-radical photoinitiators include 2-benzyl-2-(dimethylamino)-4'-morpholino-butyrophenone; 1-hydroxycyclohexyl-phenyl ketone; 2-methyl-1-[4-(methylthio)phenyl]-2-morpholino-propan-1-one; 4-methylbenzophenone; 4-phenylbenzophenone; 2-hydroxy-2-methyl-1-phenylpropanone; 1-[4-(2-hydroxyethoxyl)-phenyl]-2-hydroxy-2-methylpropanone; 2,2-dimethoxy-2-phenylacetophenone; 4-(4-methylphenylthio) benzophenone; benzophenone; 2,4-diethylthioxanthone; 4,4'-bis(diethylamino)-benzophenone; 2-isopropylthioxanthone; acylphosphine oxide derivatives, acylphosphinate derivatives, and acylphosphine derivatives (e.g., phenylbis (2,4,6-trimethylbenzoyl)phosphine oxide (available as OMNIRAD 819 from IGM Resins, St. Charles, Ill.), phenylbis(2,4,6-trimethylbenzoyl)phosphine (e.g., as available as OMNIRAD 2100 from IGM Resins), bis(2,4,6-trimethylbenzoyl)phenylphosphine oxide, 2,4,6-trimethylbenzoyldiphenylphosphine oxide (e.g., as available as OMNIRAD 8953X from IGM Resins), isopropoxyphenyl-2,4,6-trimethylbenzoylphosphine oxide, dimethyl pivaloylphosphonate), ethyl (2,4,6-trimethylbenzoyl) phenyl phosphinate (e.g., as available as OMNIRAD TPO-L from IGM Resins); bis (cyclopentadienyl) bis[2,6-difluoro-3-(1-pyrryl)phenyl]titanium (e.g., as available as OMNIRAD 784 from IGM Resins); and combinations thereof.

Reactive coupling agents are bifunctional compounds that contain groups that are covalently reactive with the alpha-alumina particles and polymerizable compound(s) in the composition. Curable compositions according to the present disclosure may contain one or more reactive coupling agents for alpha-alumina, but typically have sufficiently good mechanical properties that they are not needed. Examples of reactive coupling agents include 3-(meth)acryloxypropyl-1-trialkoxysilanes in the case of free-radically polymerizable compounds, 3-aminopropyl-1-trialkoxysilanes in the case of (meth)acrylates or polyisocyanates, and 2,3-epoxypropyltrialkoxysilanes in the case of epoxy polymerizable compounds. In some preferred embodiments, the curable composition is free of reactive coupling agents.

The curable composition may contain at least one dispersant for the alpha-alumina particles to aid in stabilizing the dispersion of particles in the curable composition diluent and in maintaining the particles as unaggregated, although this is not a requirement. A polymeric dispersant can be effective at dispersing or suspending the alpha-alumina particles to prevent them from settling out of solution and forming deposits (scale). If a polymeric dispersant is desired for inclusion in the curable composition, it can be chosen based on one or more factors, such as the type and amount of solids in the dispersant composition and the compatibility with other components in the curable composition, and the operating conditions of the application, including the pH and temperature of the curable composition.

If a dispersant is used, the diluent-particle mixture preferably contains from about 1 percent to about 100 percent by weight of dispersant relative to the weight of the particles, although this is not a requirement.

Exemplary polymeric dispersants may include anionic dispersants, nonionic dispersants, cationic dispersants, and zwitterionic dispersants. The choice of dispersant will typically be influenced by the nature of the curable composition; for example, whether it is water-based or not.

The amount of polymeric dispersant added to the curable composition can be chosen based on factors such as the particular polymer used, the application in which the curable composition is used, and compatibility with other composition reagents, if present. Any suitable amount of dispersant may be used. Typically, amounts in a weight ratio of the dispersant to the alpha-alumina particles of from 0.2 to 1.2 are effective.

Specific examples of useful polymeric dispersants include SOLPLUS D540 (a 100% active polymeric dispersant, available as from Lubrizol Corp., Brecksville, Ohio) and BYK W-9012 (phosphated polyester dispersing additive available from BYK USA, Wallingford, Conn.).

The curable composition may contain optional solvent, generally organic solvent, although water/solvent blends may be used. Exemplary optional solvents include hydrocarbons or halogenated hydrocarbons (e.g., toluene, cyclohexane, petroleum ether, lower alcohols (e.g., methanol, ethanol, propanol, and isopropanol), esters of aliphatic acids (e.g., ethyl acetate), ethers (e.g., tetrahydrofuran), and ketones (e.g., acetone and methyl ethyl ketone). The solvents can be used singly or in admixture. One skilled in the art can readily determine which solvent to use, and its amount.

The curable composition and/or the resultant cured composition may contain additional components such as, for example, fillers, thickeners, thixotropes, fragrance, antioxidant, and UV stabilizers, tougheners, pigments, fibers, tackifiers, lubricants, wetting agents, surfactants, antifoaming agents, dyes, coupling agents, plasticizers, and suspending agents.

The curable and/or cured composition may be opaque, translucent, or transparent, for example. Advantageously, due to the small particle size and low content that are typically effective to achieve beneficial mechanical (e.g., abrasion-resistance) properties, optical transparency with little or no color can be readily achieved according to the present disclosure in many cases.

Curable compositions according to the present disclosure can be typically prepared by simple mixing of the components with stirring; however, other methods may also be used.

Curing conditions for curable compositions according to the present disclosure will typically depend on the polymerizable compounds selected, and will be apparent to those of ordinary skill in the chemical arts. Examples may include, heating, exposure to particulate radiation, and exposure to ultraviolet, visible and/or infrared actinic radiation.

Curable compositions according to the present disclosure can be coated on a substrate and at least partially (preferably at least substantially or fully) cured to provide an abrasion resistant article.

Referring now to FIG. 1, abrasion resistant article 100 comprises substrate 110 having first and second opposed major surfaces 112, 114. Abrasion resistant hardcoat 120 is disposed on first major surface 112. Optional adhesive layer 130 is disposed on second major surface 114.

Exemplary substrates include paper, foil, polymer films (e.g., thermoplastic polymer films), fabric, protective eyewear (e.g., goggles and visors), windows, glass, metal (e.g., foil, chrome plumbing fixtures, chrome automotive trim), optical elements (e.g., lenses, mirrors, and prisms) and electronic displays, painted layers (e.g., a paint layer on sheet metal) which may optionally have a polymeric clearcoat thereon. In some embodiments, the substrate comprises a thermoformable polymer film comprising one or more thermoplastic polymers. The thermoformable polymer film may be unitary or it may be a composite film comprising multiple layers which may be different. The substrate may be in sheet form or a continuous web, for example, and may have any thickness. In embodiments wherein the substrate is a thermoplastic polymer film, substrate preferably has a thickness of from 25 microns to 3 mm, although this is not a requirement.

Exemplary adhesives that can be used in the optional adhesive layer include pressure-sensitive adhesives, hotmelt adhesives, thermosetting adhesives, and combinations thereof.

Thermoforming is a manufacturing process whereby a thermoplastic film is heated to a pliable forming temperature, formed to a specific shape in a mold, and trimmed to create a usable product. The film is typically heated in an oven to a high-enough temperature that permits it to be stretched into or onto a mold and cooled to a finished shape. Its simplified version is vacuum forming. Suitable thermoforming techniques are well known to those of skill in the art.

Thermoformed abrasion resistant articles according to the present disclosure can be affixed a second substrate such as, for example, a lens by any suitable method such as, for example, heat lamination, backfill injection molding, or adhesive (e.g., optional adhesive layer 130 in FIG. 1).

SELECT EMBODIMENTS OF THE PRESENT DISCLOSURE

In a first embodiment, the present disclosure provides a curable composition comprising:

at least one polymerizable compound; and alpha-alumina particles, wherein the alpha-alumina particles, taken as a whole, have a $D_V50$ of less than 100 nanometers.

In a second embodiment, the present disclosure provides a curable composition according to the first embodiment, wherein the at least one polymerizable compound comprises at least one free-radically polymerizable compound.

In a third embodiment, the present disclosure provides a curable composition according to the first or second embodiment, further comprising at least one curative for the at least one polymerizable compound.

In a fourth embodiment, the present disclosure provides a curable composition according to the third embodiment, wherein the at least one curative comprises a free-radical initiator.

In a fifth embodiment, the present disclosure provides a curable composition according to any one of the first to fourth embodiments, further comprising a dispersant for the alpha-alumina particles, wherein the weight ratio of the dispersant to the alpha-alumina particles is from 0.2 to 1.2.

In a sixth embodiment, the present disclosure provides a curable composition according to any one of the first to fifth embodiments, wherein the curable composition is free of compounds (such as, for example, reactive coupling agents) containing groups that are covalently reactive with the alpha-alumina particles.

In a seventh embodiment, the present disclosure provides a curable composition according to any one of the first to sixth embodiments, wherein the alpha-alumina particles, taken as a whole, have a $D_V50$ of 50 to 80 nanometers.

In an eighth embodiment, the present disclosure provides a curable composition according to any one of the first to seventh embodiments, wherein, on a total weight basis, the curable composition contains 0.1 to 5 percent by weight of the alpha-alumina particles.

In a ninth embodiment, the present disclosure provides a curable composition according to any one of the first to eighth embodiments, wherein, on a total weight basis, the curable composition contains 0.1 to 2 percent by weight of the alpha-alumina particles.

In a tenth embodiment, the present disclosure provides a curable composition according to any one of the first to ninth embodiments, wherein the curable composition is optically transparent and colorless.

In an eleventh embodiment, the present disclosure provides a polymerized reaction product of a curable composition according to any one of the first to tenth embodiments.

In a twelfth embodiment, the present disclosure provides an abrasion-resistant article comprising a substrate having an abrasion-resistant layer disposed thereon, wherein the abrasion-resistant layer comprises polymerized reaction product of a curable composition according to any one of the first to tenth embodiments.

In a thirteenth embodiment, the present disclosure provides an abrasion-resistant article according to the twelfth embodiment, wherein the substrate comprises an optical element.

In a fourteenth embodiment, the present disclosure provides an abrasion-resistant article according to the twelfth or thirteenth embodiment, wherein the substrate includes at least one of a painted layer or a polymeric clearcoat, and wherein the abrasion-resistant layer protects at least a portion of said at least one of the painted layer or the polymeric clearcoat.

In a fifteenth embodiment, the present disclosure provides a method of making an abrasion-resistant thermoformed article, the method comprising thermoforming abrasion-resistant article according to any one of the twelfth to fourteenth embodiments.

In a sixteenth embodiment, the present disclosure provides a method of making an abrasion-resistant thermoformed article according to the fifteenth embodiment, wherein the substrate comprises an optically clear element.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

TABLE 1

| DESIGNATION | DESCRIPTION |
|---|---|
| MEK | methyl ethyl ketone from Alfa Aesar, Ward Hill, Massachusetts |
| MP | 1-methoxy-2-propanol |
| PC film | Bisphenol A-based polycarbonate film, 5 mil (0.13 mm) thick, available as LEXAN 8010-112MC film from Sabic Innovative Plastics, Riyadh, Saudi Arabia |
| PI1 | ESACURE ONE, photoinitiator, obtained from Lamberti USA, Conshohocken, Pennsylvania |
| SR611 | alkoxylated tetrahydrofurfuryl acrylate monomer from Sartomer Co., Exton, Pennsylvania |
| SR9035 | 15-mole ethoxylated trimethylolpropane triacrylate from Sartomer Co. |
| SR444C | Pentaerythritol triacrylate from Sartomer Co. |
| TE2100 | TEGORAD 2100 silicone acrylate, obtained from Evonik Industries |
| 20 nm $SiO_2$ | 45 wt. %, Prepared according to the procedure on page 14, line 30 to page 15, line 10 of PCT Internat. Publ. No. WO 2014/011731 A1 (Pokorny et al.) |
| 75 nm $SiO_2$ | 29.7 wt. %, Prepared according to the procedure on Example [0117] on page 9 of PCT Internat. Publ. No. US 2016/0326383 A1 (Pokorny et al.) |
| AANP | Alpha-Alumina Nano Powder, 99.99% purity, obtained as 26N-0811UPA from Inframat Advanced Materials, Manchester, Connecticut |
| W9012 | solvent-free wetting and dispersing additive, available as BYK-W-9012 from BYK-Chemie, Wesel, Germany |

Eraser Abrasion Test

Abrasion of film samples was tested downweb to the coating direction using a Taber model 5750 Linear Abraser (Taber Industries, North Tonawanda, N.Y.). The collet oscillated at 40 cycles/minute and the length of stroke was 2 inches (5.1 cm). The abrasive material used for this test was an eraser insert (from Summers Optical, a division of EMS Acquisition Corp., Hatfield, Pa.). The eraser insert had a diameter of 6.5 mm and met the requirements of military standard Mil-E-12397B.

The eraser insert was held in place through duration of test by the collet. One sample was tested on three different spots for each example with a weight of 1.1 kg weight and 20 cycles. After abrasion, the sample was cleaned by wiping with a lens cleaning towelette (Radnor Products, Radnor, Pa.). The optical haze and transmission of each sample was measured using a Haze-Gard Plus haze meter (BYK Gardner, Columbia, Md.) at the three different spots. The reported values of haze and transmission are the average of the values obtained on the three different spots. The delta haze value for each sample was calculated by subtracting the haze of an untested region of the sample. The loss of transmission for each sample was calculated by subtracting the transmission of an untested region of the sample from the transmission of a tested region.

Thermoforming Procedure

Thermoforming on a lens mold was performed using a MAAC sheet feed vacuum thermoforming system (MAAC machinery Corp., Carol Stream, Ill.). The thermoforming system clamped the coated film sheet to be thermoformed, and the sheet was shuttled between top and bottom heating elements to heat the sheet to a temperature of 340° F. (171° C.) to 380° F. (193° C.). The heated sheet was then shuttled over the top of a forming tool with the 8 base lens geometry (diameter of the mold cavity was 86 mm and the height was 16 mm). The tool was heated to a temperature of 150° F. (66° C.) to 250° F. (121° C.). Then, the tool was raised into the sheet and vacuum was pulled to force the heated sheet to form to the 8 base lens tool geometry.

Hardcoats on thermoplastic films were assessed for their thermoformability, by thermoforming them into a lens shape and determining the amount of cracking of the hardcoat from the edges of the lens shape to the center of the lens shape. The most preferred embodiments exhibit no cracking anywhere on the lens shape. If the coating on the lens shape cracked, the crack usually started on the edge. The percent crack from the edge was measured from the edge of the lens to the center of the lens. For example, if a crack started at the edge and continued 20% of the distance between the edge and the center of the lens shape, then cracking was reported as 20% from the edge. If cracks were present half way between the edge and the center, the crack level was recorded as 50% crack up from the edge. The percentage location was measured visually with an un-aided eye.

Preparation of Urethane Acrylate Oligomer (1427)

A 250-mL jar equipped with a magnetic stir bar was charged with 39.76 g (0.2082 eq.) of DESMODUR N100 biuret-based hexamethylene diisocyanate oligomer (obtained from Covestro LLC, Pittsburgh, Pa.), 25 g of MEK, 12.33 g (0.1062 eq.) of 2-hydroxyethyl acrylate (Alfa Aesar), 47.91 g (0.1062 eq.) of pentaerythritol triacrylate (obtained as SR444C from Sartomer Co., Exton, Pa.), for a total of 1.01 eq. OH per eq. of NCO, 0.025 g (250 ppm) 2,6-di-t-butyl-4-methylphenol (BHT, Aldrich Chemical Co.), 0.005 g (50 ppm) of 4-hydroxy-2,2,6,6-tetramethylpiperidine-1-oxyl (4-hydroxy TEMPO, Aldrich Chemical Co.) and 0.05 g (500 ppm) of dibutyltin dilaurate (Aldrich Chemical Co.). The jar was placed in a water bath at room temperature and allowed to stir for 10 min. After 10 min., it was placed into a 55° C. bath for 4 hr. At the end of that time, the reaction mixture was monitored by FTIR and found to have no NCO peak at 2265 $cm^1$. The resulting material was 80 weight percent solids, and had a molecular average acrylate functionality of 7.2.

Preparation of Alpha-Alumina Nanoparticles (AANP1)

An alpha-alumina nanoparticle dispersion was made by a media milling process. 180 g of MEK, 180 g of W9012 dispersing additive (BYK USA, Wallingford, Conn.), and 181 g of AANP were mixed together using a Dispermat CN-10 laboratory high-shear disperser (BYK-Gardner USA, Columbia, Md.). The mixed dispersion was milled in a MiniCer laboratory media mill (Netzsch, Exton, Pa.) with 0.2 mm yttria-stabilized zirconia milling media. Aliquots (0.2 mL) were sampled every hour for 8 hours. Each aliquot was diluted with 2 mL of MEK prior to particle size analysis by laser diffraction, which was performed using a Horiba LA-960 laser particle size analyzer. The resultant alpha-alumina nanoparticle dispersion had 54 wt. % total solids and an alpha-alumina content of 27 wt. %, a median particle diameter of 0.067 microns, a $D_V50$ of 0.0672 (Std Dev=0.009) microns, and a $D_V90$ of 0.0796 microns.

Master Formulation A:

Master Formulation A was prepared by mixing the components reported in Table 2, below.

TABLE 2

| MASTER FORMULATION A | |
|---|---|
| COMPONENT | QUANTITY, g |
| 1427 | 34.80 |
| TE2100 | 0.32 |
| PI1 | 0.64 |
| ethanol | 48.00 |
| MP | 6.00 |

Examples 1-7 and Comparative Example A

AANP1 was used to make the formulations reported in Table 3, wherein in addition to the listed ingredients, all examples contained 4.5 g of Master Formulation A and 0.25 g of SR611 (diluted to 32 wt. % with ethanol), and had a total solids content of 32.1 percent.

Comparative Example A did not contain alpha-alumina nanoparticles. The formulations were hand-coated on PC film using a #12 wire-wound rod (RD Specialties, Webster, N.Y., 0.30 mm wire size). The coated PC films were allowed to dry at room temperature first and then dried at 80° C. in an oven for 1 min. The dried samples were cured using a UV processor equipped with an H-type bulb (500 W, Heraeus Noblelight America/Fusion UV Systems, Gaithersburg, Md.) at 100% power under nitrogen purge at 30 feet/min (9.1 m/min).

Some of the samples were subjected to the Lens Thermoforming Procedure. The ratings of thermoformed samples were: Comparative Example A—cracks 0%, Example 3—cracks 0%, Example 4—cracks at edge, Example 5—cracks 10% up on edge.

TABLE 3

| EXAMPLE | AANP1, g | ETHANOL, g | EFFECTIVE AANP1 SOLIDS, % of Total Solids |
|---|---|---|---|
| COMPARATIVE EXAMPLE A | 0.000 | 0.00 | 0.0 |
| 1 | 0.035 | 0.02 | 0.6 |
| 2 | 0.072 | 0.05 | 1.2 |
| 3 | 0.150 | 0.10 | 2.5 |
| 4 | 0.315 | 0.21 | 5.0 |
| 5 | 0.710 | 0.48 | 10.0 |
| 6 | 1.210 | 0.82 | 15.0 |
| 7 | 1.880 | 1.27 | 20.0 |

The transmission and haze before and after the eraser abrasion test are reported in Table 4, below.

TABLE 4

| | BEFORE ERASER ABRASION | | AFTER ERASER ABRASION | | | |
|---|---|---|---|---|---|---|
| | % | | % | | Δ (After-Before) | |
| EXAMPLE | Transmission (Std Dev) | % Haze (Std Dev) | Transmission (Std Dev) | % Haze (Std Dev) | Δ % Transmission | Δ % Haze |
| COMPARATIVE EXAMPLE A | 91.4 (0.00) | 0.16 (0.06) | 91.2 (0.00) | 7.05 (0.31) | −0.2 | 6.89 |
| 1 | 91.4 (0.06) | 0.16 (0.03) | 91.3 (0.08) | 5.89 (0.88) | −0.1 | 5.73 |
| 2 | 91.1 (0.00) | 0.23 (0.00) | 91.4 (0.06) | 5.47 (0.65) | 0.3 | 5.24 |
| 3 | 90.7 (0.06) | 0.58 (0.09) | 91.3 (0.00) | 3.80 (0.80) | 0.6 | 3.22 |
| 4 | 90.2 (0.00) | 1.77 (0.06) | 91.0 (0.06) | 4.85 (0.84) | 0.8 | 3.08 |
| 5 | 89.4 (0.10) | 5.43 (0.21) | 90.5 (0.12) | 9.64 (0.21) | 1.1 | 4.21 |
| 6 | 88.9 (0.00) | 11.5 (0.25) | 90.0 (0.06) | 14.6 (0.25) | 1.1 | 3.10 |
| 7 | 88.7 (0.06) | 15.4 (0.61) | 89.5 (0.06) | 19.6 (0.26) | 0.8 | 4.20 |

AANP1 was used to make the formulations reported in Table 5. The formulations were hand-coated on PC film using a #12 wire-wound rod (RD Specialties, Webster, N.Y., 0.30 mm wire size). The coated PC films were allowed to dry at room temperature first and then dried at 80° C. in an oven for 1 min. The dried samples were cured using a UV processor equipped with an H-type bulb (500 W, Heraeus Noblelight America/Fusion UV Systems, Gaithersburg, Md.) at 100% power under nitrogen purge at 30 feet/min (9.1 m/min).

TABLE 5

| | COMPARATIVE EXAMPLE B | COMPARATIVE EXAMPLE C | EXAMPLE 8 | EXAMPLE 9 |
|---|---|---|---|---|
| PI1 | 0.03 | 0.03 | 0.06 | 0.06 |
| 20 nm SiO2, g | 2.90 | 0.00 | 0.00 | 0.00 |
| 75 nm SiO2, g | 0.00 | 4.40 | 0.00 | 0.00 |
| AANP1, g | 0.00 | 0.00 | 0.09 | 0.19 |
| SR9035, g | 0.373 | 0.373 | 0.746 | 0.746 |
| SR444C, g | 0.559 | 0.559 | 1.118 | 1.118 |
| Ethanol, g | 3.20 | 1.70 | 4.13 | 4.19 |

TABLE 5-continued

| | COMPARATIVE EXAMPLE B | COMPARATIVE EXAMPLE C | EXAMPLE 8 | EXAMPLE 9 |
|---|---|---|---|---|
| % Total Solids | 32.1 | 32.1 | 32.1 | 32.1 |
| EFFECTIVE PARTICLE SOLIDS, % of Total Solids | 57.6 | 57.6 | 1.2 | 2.5 |

The transmission and haze before and after the eraser abrasion test are reported in Table 6, below.

TABLE 6

| | BEFORE ERASER ABRASION | | AFTER ERASER ABRASION | | Δ (After-Before) | |
|---|---|---|---|---|---|---|
| EXAMPLE | % Transmission (Std Dev) | % Haze (Std Dev) | % Transmission (Std Dev) | % Haze (Std Dev) | Δ % Transmission | Δ % Haze |
| COMPARATIVE EXAMPLE B | 91.5 (0.04) | 0.17 (0.07) | 91.6 (0.00) | 0.89 (0.16) | 0.1 | 0.72 |
| COMPARATIVE EXAMPLE C | 91.8 (0.00) | 0.19 (0.07) | 91.8 (0.00) | 0.86 (0.06) | 0.0 | 0.67 |
| 8 | 91.3 (0.00) | 0.32 (0.08) | 91.3 (0.06) | 1.10 (0.12) | 0.0 | 0.78 |
| 9 | 91.1 (0.10) | 0.69 (0.00) | 91.2 (0.00) | 1.35 (0.07) | 0.1 | 0.66 |

Preparation of Alpha-Alumina Dispersions Disp1-Disp9

AANP1 was treated with surface-modifying agent in MEK with stirring for 24 hours before it was added to coating formulations as reported in Table 7. The alpha-alumina nanoparticle dispersion had a total solid percentage of 54.0 wt. % including 27.0 wt. % of alpha-alumina nanoparticles and 27.0 wt. % W9012 dispersant, prior to adding surface-modifying agent. Dispersions in Table 7 (below) were 27.0 wt. % included 1.4 grams of alpha-alumina nanoparticles (AANP1) and 406.3 micromoles of the specified surface-modifying agent.

TABLE 7

| SURFACE-MODIFIED ALUMINA DISPERSION | SURFACE-MODIFYING AGENT | WEIGHT OF SURFACE-MODIFYING AGENT, g |
|---|---|---|
| DISP1 | None | 0 |
| DISP2 | A174 Silane | 0.101 |
| DISP3 | HEMA-SA | 0.094 |
| DISP4 | HEMA-PO4 | 0.085 |
| DISP5 | HEA-SA | 0.088 |
| DISP6 | HEA-PO4 | 0.08 |
| DISP7 | K90 Silane | 0.087 |
| DISP8 | Acrylic Acid | 0.029 |
| DISP9 | Methacrylic acid | 0.035 |

Examples 10-28

Coating formulations containing surface modified alpha-alumina nanoparticles are reported in Table 8. The formulations were hand-coated on PC film using a #12 wire-wound rod (RD Specialties, 0.30 mm nominal wet thickness). The coated PC films were allowed to dry at room temperature first and then dried at 80° C. in an oven for 1 min. The dried samples were cured using a UV processor equipped with an H-type bulb (500 W, Heraeus Noblelight America/Fusion UV Systems) at 100% power under nitrogen purge at 30 feet/min (9.1 m/min). In Table 8 (below), all examples also included 4.50 g of Master Formulation A and 0.25 g of SR611 (32 wt. % in ethanol), and had a total solids content of 32.1 wt. %.

TABLE 8

| EXAMPLE | SURFACE-MODIFIED ALUMINA DISPERSION | Modified α-Alumina Solids, g | Ethanol, g | Effective Particle wt. % based on Total Solids |
|---|---|---|---|---|
| 10 | DISP1 | 0.000 | 0.00 | 0.0 |
| 11 | | 0.072 | 0.05 | 1.2 |
| 12 | | 0.150 | 0.10 | 2.5 |
| 13 | DISP2 | 0.071 | 0.05 | 1.2 |
| 14 | | 0.145 | 0.10 | 2.4 |
| 15 | DISP3 | 0.071 | 0.05 | 1.2 |
| 16 | | 0.145 | 0.10 | 2.4 |
| 17 | DISP4 | 0.071 | 0.05 | 1.2 |
| 18 | | 0.145 | 0.10 | 2.4 |
| 19 | DISP5 | 0.071 | 0.05 | 1.2 |
| 20 | | 0.145 | 0.10 | 2.4 |
| 21 | DISP6 | 0.071 | 0.05 | 1.2 |
| 22 | | 0.145 | 0.10 | 2.4 |
| 23 | DISP7 | 0.071 | 0.05 | 1.2 |
| 24 | | 0.145 | 0.10 | 2.4 |
| 25 | DISP8 | 0.071 | 0.05 | 1.2 |
| 26 | | 0.148 | 0.10 | 2.5 |
| 27 | DISP9 | 0.071 | 0.05 | 1.2 |
| 28 | | 0.148 | 0.10 | 2.5 |

The transmission and haze before and after the eraser abrasion test are reported in Table 9, below.

TABLE 9

| EXAMPLE | BEFORE ERASER ABRASION % Transmission (Std Dev) | BEFORE ERASER ABRASION % Haze (Std Dev) | AFTER ERASER ABRASION % Transmission (Std Dev) | AFTER ERASER ABRASION % Haze (Std Dev) | Δ (After-Before) Δ % Transmission | Δ (After-Before) Δ % Haze |
|---|---|---|---|---|---|---|
| 10 | 91.3 (0.06) | 0.22 (0.07) | 92.3 (0.00) | 3.00 (0.29) | 1.0 | 2.78 |
| 11 | 91.1 (0.10) | 0.43 (0.03) | 92.1 (0.10) | 3.18 (0.04) | 1.0 | 2.75 |
| 12 | 90.9 (0.00) | 0.79 (0.12) | 92.0 (0.10) | 3.31 (0.11) | 1.1 | 2.52 |
| 13 | 91.1 (0.06) | 0.51 (0.00) | 92.0 (0.06) | 3.35 (0.05) | 0.9 | 2.84 |
| 14 | 90.9 (0.06) | 0.74 (0.06) | 91.9 (0.06) | 3.45 (0.12) | 1.0 | 2.71 |
| 15 | 91.3 (0.00) | 0.45 (0.07) | 91.9 (0.15) | 3.13 (0.17) | 0.6 | 2.68 |
| 16 | 91.1 (0.06) | 0.62 (0.07) | 91.8 (0.06) | 2.87 (0.14) | 0.7 | 2.25 |
| 17 | 91.4 (0.00) | 0.49 (0.05) | 92.0 (0.06) | 3.08 (0.27) | 0.6 | 2.59 |
| 18 | 91.3 (0.06) | 0.82 (0.08) | 91.8 (0.06) | 2.45 (0.18) | 0.5 | 1.63 |
| 19 | 91.4 (0.06) | 0.43 (0.02) | 92.0 (0.06) | 1.36 (0.19) | 0.6 | 0.93 |
| 20 | 91.3 (0.06) | 0.72 (0.00) | 91.8 (0.00) | 1.95 (0.24) | 0.5 | 1.23 |
| 21 | 91.5 (0.10) | 0.53 (0.04) | 91.9 (0.06) | 2.38 (0.11) | 0.4 | 1.85 |
| 22 | 91.3 (0.00) | 0.62 (0.03) | 91.8 (0.06) | 2.27 (0.04) | 0.5 | 1.65 |
| 23 | 91.5 (0.06) | 0.28 (0.05) | 92.0 (0.00) | 2.37 (0.13) | 0.5 | 2.09 |
| 24 | 91.4 (0.06) | 0.75 ( )0.10 | 91.9 (0.06) | 2.37 (0.14) | 0.5 | 1.62 |
| 25 | 91.7 (0.00) | 0.39 (0.03) | 91.8 (0.06) | 3.02 (0.12) | 0.1 | 2.63 |
| 26 | 91.4 (0.12) | 0.81 (0.13) | 91.8 (0.06) | 3.47 (0.40) | 0.4 | 2.66 |
| 27 | 91.7 (0.06) | 0.46 (0.05) | 91.8 (0.06) | 2.97 (0.13) | 0.1 | 2.51 |
| 28 | 91.5 (0.06) | 0.79 (0.04) | 91.5 (0.00) | 3.56 (0.27) | 0.0 | 2.77 |

All cited references, patents, and patent applications in this application that are incorporated by reference, are incorporated in a consistent manner. In the event of inconsistencies or contradictions between portions of the incorporated references and this application, the information in this application shall control. The preceding description, given in order to enable one of ordinary skill in the art to practice the claimed disclosure, is not to be construed as limiting the scope of the disclosure, which is defined by the claims and all equivalents thereto.

What is claimed is:

1. A curable composition comprising:

at least one polymerizable compound comprising a (meth) acryl group, an isocyanato group, or combinations thereof;

at least one curative for the at least one polymerizable compound, wherein the at least one curative comprises a free-radical initiator; and 0.1 to 10 percent by weight alpha-alumina particles based on a total solids weight, wherein the alpha-alumina particles, taken as a whole, have a Dv50 of less than 100 nanometers.

2. The curable composition of claim 1, further comprising a dispersant for the alpha-alumina particles, wherein the weight ratio of the dispersant to the alpha-alumina particles is from 0.2 to 1.2.

3. The curable composition of claim 1, wherein the curable composition is free of compounds containing groups that are covalently reactive with the alpha-alumina particles.

4. The curable composition of claim 1, wherein the alpha-alumina particles, taken as a whole, have a Dv50 of 50 to 80 nanometers.

5. The curable composition of claim 1, wherein, on a total weight basis, the curable composition contains 0.1 to 5 percent by weight of the alpha-alumina particles.

6. The curable composition of claim 1, wherein, on a total weight basis, the curable composition contains 0.1 to 2 percent by weight of the alpha-alumina particles.

7. The curable composition of claim 1, wherein the curable composition is optically transparent and colorless.

8. A polymerized reaction product of components comprising:

at least one polymerizable compound comprising a (meth) acryl group, an isocyanato group, or combinations thereof;

at least one curative for the at least one polymerizable compound, wherein the at least one curative comprises a free-radical initiator; and p1 0.1 to 10 percent by weight alpha-alumina particles based on a total weight basis, wherein the alpha-alumina particles, taken as a whole, have a Dv50 of less than 100 nanometers.

9. An abrasion-resistant article comprising a substrate having an abrasion-resistant layer disposed thereon, wherein the abrasion-resistant layer comprises the polymerized reaction product of claim 8.

10. The abrasion-resistant article of claim 9, wherein the substrate comprises an optical element.

11. The abrasion-resistant article of claim 9, wherein the substrate includes at least one of a painted layer or a polymeric clearcoat, and wherein the abrasion-resistant layer protects at least a portion of said at least one of the painted layer or the polymeric clearcoat.

12. A method of making an abrasion-resistant thermoformed article, the method comprising thermoforming the abrasion-resistant article of claim 9.

13. The curable composition of claim 1, wherein the alpha- alumina particles are surface modified with acrylic or methacrylic acid.

14. The polymerized reaction product of claim 8, wherein the polymerized reaction product comprises 0.1 to 2 percent by weight alpha-alumina particles based on a total weight basis.

15. The curable composition of claim 1, wherein the free-radical initiator is a photoinitiator.

* * * * *